United States Patent
MacKarvich

(10) Patent No.: US 6,550,798 B2
(45) Date of Patent: Apr. 22, 2003

(54) ADJUSTABLE AXLE CONNECTOR

(76) Inventor: Charles J. MacKarvich, 3940 Paces Manor Dr., Atlanta, GA (US) 30339

( * ) Notice: Subject to any disclaimer, the term of this patent is extended or adjusted under 35 U.S.C. 154(b) by 135 days.

(21) Appl. No.: 09/793,019

(22) Filed: Feb. 26, 2001

(65) Prior Publication Data

US 2002/0117828 A1 Aug. 29, 2002

(51) Int. Cl.⁷ .......................... B60B 35/00; B60G 11/00
(52) U.S. Cl. ................ 280/149.2; 180/906; 248/228.5; 248/229.14; 301/125
(58) Field of Search .................... 280/149.2, 788, 280/124.13, 124.166, 124.169; 180/905, 906; 301/124.1, 125; 403/373, 374.2, 374.3, 408.1; 248/229.14, 229.24, 228.5, 231.61

(56) References Cited

U.S. PATENT DOCUMENTS

| | | | | |
|---|---|---|---|---|
| 852,209 A | * | 5/1907 | Goss .......................... 126/77 |
| 1,281,531 A | * | 10/1918 | Dietrich ................... 248/228.5 |
| 1,292,771 A | * | 1/1919 | Heider ....................... 301/125 |
| 3,217,833 A | * | 11/1965 | Smith ...................... 248/228.5 |
| 3,730,549 A | | 5/1973 | Turner, Jr. .................. 280/124 |
| 3,861,708 A | | 1/1975 | Fier ............................ 280/124 |
| 3,915,504 A | | 10/1975 | Bauer ......................... 301/130 |
| 4,000,913 A | | 1/1977 | Gibson ........................ 280/704 |
| 4,111,451 A | | 9/1978 | Pinto ............................ 280/408 |
| 4,220,349 A | * | 9/1980 | Gaussin ..................... 280/788 |
| 4,540,220 A | | 9/1985 | Roeth et al. ................ 301/125 |
| 4,693,486 A | | 9/1987 | Pierce et al. .................... 280/80 |
| 4,775,166 A | | 10/1988 | VanDenberg et al. ....... 280/677 |
| 4,946,190 A | | 8/1990 | Büttner ....................... 280/712 |
| 4,993,729 A | | 2/1991 | Payne ........................ 280/81.1 |
| 5,104,079 A | * | 4/1992 | Hardtke .................... 248/228.5 |
| 5,129,672 A | | 7/1992 | Hiromoto et al. ............ 280/720 |
| 5,255,756 A | | 10/1993 | Follmer et al. ............. 180/131 |
| 5,326,128 A | | 7/1994 | Cromley, Jr. ............... 280/656 |
| 5,667,231 A | | 9/1997 | Dierks et al. ............ 280/149.2 |
| 5,791,743 A | | 8/1998 | Sitter et al. .................. 301/125 |
| 5,810,377 A | | 9/1998 | Keeler et al. ............... 280/96.1 |
| 5,921,570 A | | 7/1999 | Lie ............................. 280/124 |
| 6,032,967 A | | 3/2000 | Ogoniek .............. 280/124.175 |
| 6,364,041 B1 | * | 4/2002 | Vangsgard ............... 180/24.12 |

* cited by examiner

Primary Examiner—Paul N. Dickson
Assistant Examiner—David R. Dunn

(57) ABSTRACT

An adjustable axle-frame connector 10 for mounting an axle 40 to the frame 30 of a vehicle. The adjustable axle-frame connector 10 includes an axle mounting plate 12, an axle hold down bracket 20, and a U-bolt 24a. The axle mounting plate 12 with a first end for positioning on one side of the vehicle frame 30 and a second end having a mounting slot 17 formed therein. The first end is configured to engage the frame 30 when the axle mounting plate 12 is positioned between the frame 30 and the axle 40, the axle 40 extending transversely to the longitudinal axis of the frame 30. The second end has positioning tabs 18 that are configured to straddle the axle 40 when the axle mounting plate 12 is positioned between the frame 30 and the axle 40. The axle hold down bracket 20 has a proximal end 21 and a distal end, the distal end including a locator flange 22 configured to engage the mounting slot 17 of the axle mounting plate 12 when the proximal end 21 is placed in abutment with the frame 30 of the vehicle. Lastly, the U-bolt 24a urges the axle hold down bracket 20 against the frame 30 of the vehicle, thereby securing the axle 40 to the vehicle as well.

21 Claims, 6 Drawing Sheets

ADJUSTABLE AXLE CONNECTOR

FIELD OF THE INVENTION

The present invention generally relates to a connector, and more particularly to an adjustable connector for removably mounting an axle to a vehicle frame.

BACKGROUND OF THE INVENTION

Quite often, trailers and other wheeled vehicles employ axles which are box-shaped in cross-section and attached to the vehicle frame. Typically, the vehicle frame is an I-beam, or possibly a channel beam. For example, torsion axles are often used on light weight vehicles such as boat trailers. These axles are known to generally comprise a unitary, one piece construction wherein spindle axles are welded into the torsion arms of the torsion axle assembly. The torsion arm is in turn welded to a square inner torsion bar that is seated inside a square tubular axle beam, wherein the four corners of the square tubular axle beam accept rubber cords of a given length that provide torsional resistance to the square inner torsion bar. Often, the box-shaped axle beam is welded to the vehicular frame.

A general complaint regarding the use of a torsion axle assembly has been that if a spindle axle becomes damaged due to excessive bearing wear or excessive impact, repairing the damaged spindle axle thereon requires removing the entire torsion axle. Removal of the entire torsion axle is time consuming and inordinately costly when the axle has been welded to the frame. Moreover, repair usually cannot be undertaken en route, and the vehicle must be carried to a repair facility. As well, oftentimes an axle assembly is only required to be attached to a frame during transportation, the axle not being necessary upon delivery of the frame and associated structure. Transportation of mobile homes is one such instance. Once a mobile home has been transported to the desired location, the axle assemblies will not be needed until the home is to be moved again. Also, removal of an axle from one vehicle frame for use on another vehicle frame significantly lowers costs in that fewer axles are required.

Accordingly, it can be understood that it would be desirable to have a means of quickly and easily removing an axle assembly from a vehicle frame. The disclosure of the present invention provides such means.

Therefore, there is a need for improved systems and methods which address these and other shortcomings of the prior art.

SUMMARY OF THE INVENTION

The present invention is generally directed to an adjustable connector for mounting an axle to the frame of a vehicle. The adjustable connector includes an axle mounting plate, an axle hold down bracket, and a securing means. The axle mounting plate has a first end for positioning on one side of the vehicle frame and a second end having a mounting slot formed therein. The first end is configured to engage the frame when the axle mounting plate is positioned between the frame and the axle, the axle extending transversely to the longitudinal axis of the frame. The second end has positioning tabs that are configured to straddle the axle when the axle mounting plate is positioned between the frame and the axle. The axle hold down bracket has a proximal end and a distal end, the distal end including a locator flange configured to engage the mounting slot of the axle mounting plate when the proximal end is placed in abutment with the frame of the vehicle. Lastly, the securing means urges the axle hold down bracket against the frame of the vehicle, thereby securing the frame to the vehicle as well.

The present invention is also related to a method for securing an axle to a vehicle frame, including the steps of: providing an axle mounting plate having a first end, a second end, and a first plurality of apertures and a mounting slot formed therein, the first end configured to engage a frame, the second end having positioning tabs configured to lie on opposing sides of the axle when the axle mounting plate is positioned between the frame and the axle; providing an axle hold down bracket having a proximal end, a distal end, and a first plurality of apertures formed therein, the distal end having a locator flange, the locator flange configured to engage the mounting slot disposed in the axle mounting plate, the proximal end adapted to abut a portion of the frame; providing a securing means for maintaining the axle, the axle mounting plate, and the axle hold down bracket in position relative to the frame; engaging the frame with the first end of the axle hold down plate; positioning the axle between the positioning tabs such that the axle mounting plate abuts both the frame and the axle; inserting the distal end of the axle hold down bracket in the mounting slot; placing the proximal end of the axle hold down bracket in abutment with the frame such that a portion of the frame is located between the first end of the axle mounting plate and the proximal end of the axle hold down bracket; inserting the securing means through the first pluralities of apertures in the axle mounting plate and the axle hold down bracket; and engaging the securing means such that the axle, the axle mounting plate, and the axle hold down bracket are secured to the frame.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

DESCRIPTION OF THE DRAWINGS

The accompanying drawings incorporated in and forming a part of the specification, illustrate several aspects of the present invention, and together with the description serve to explain the principles of the invention. In the drawings.

Figure 1:
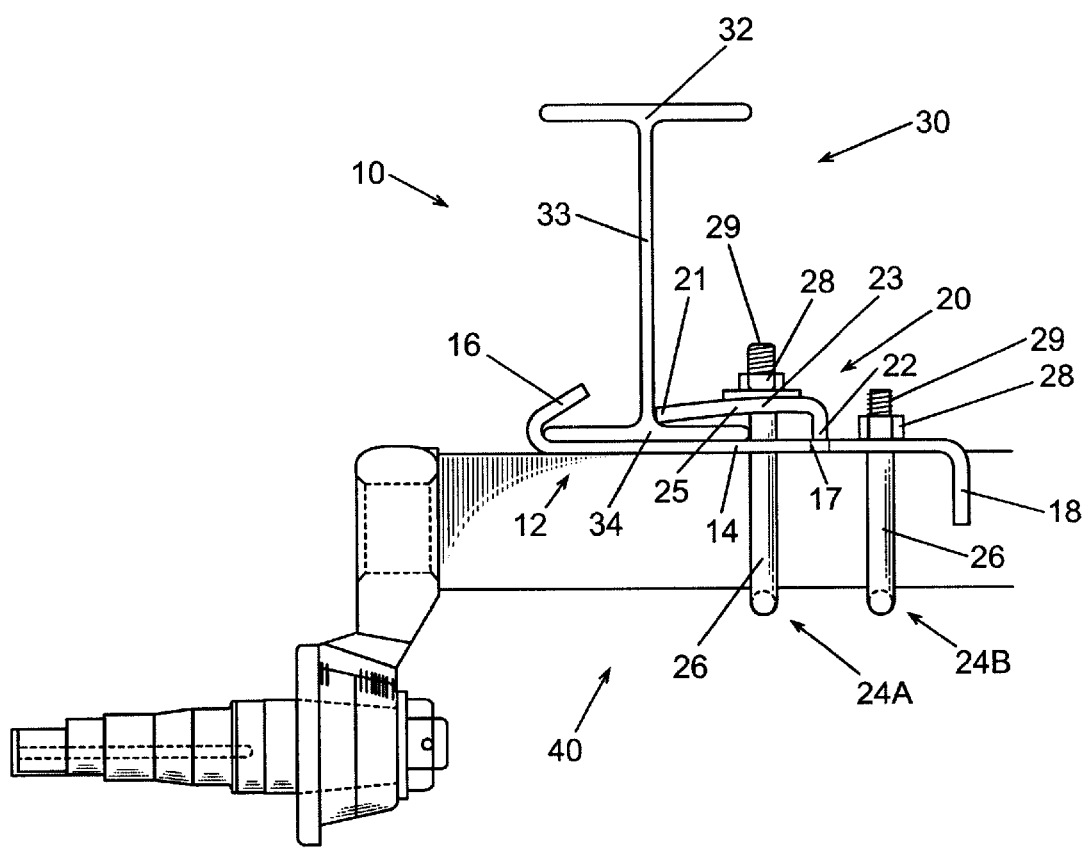
FIG. 1 is a back view of a left side connector assembly of an embodiment of the present invention, including portions of both a frame and an axle.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DETAILED DESCRIPTION OF THE PREFERRED EMBODIMENT

Figure 2:
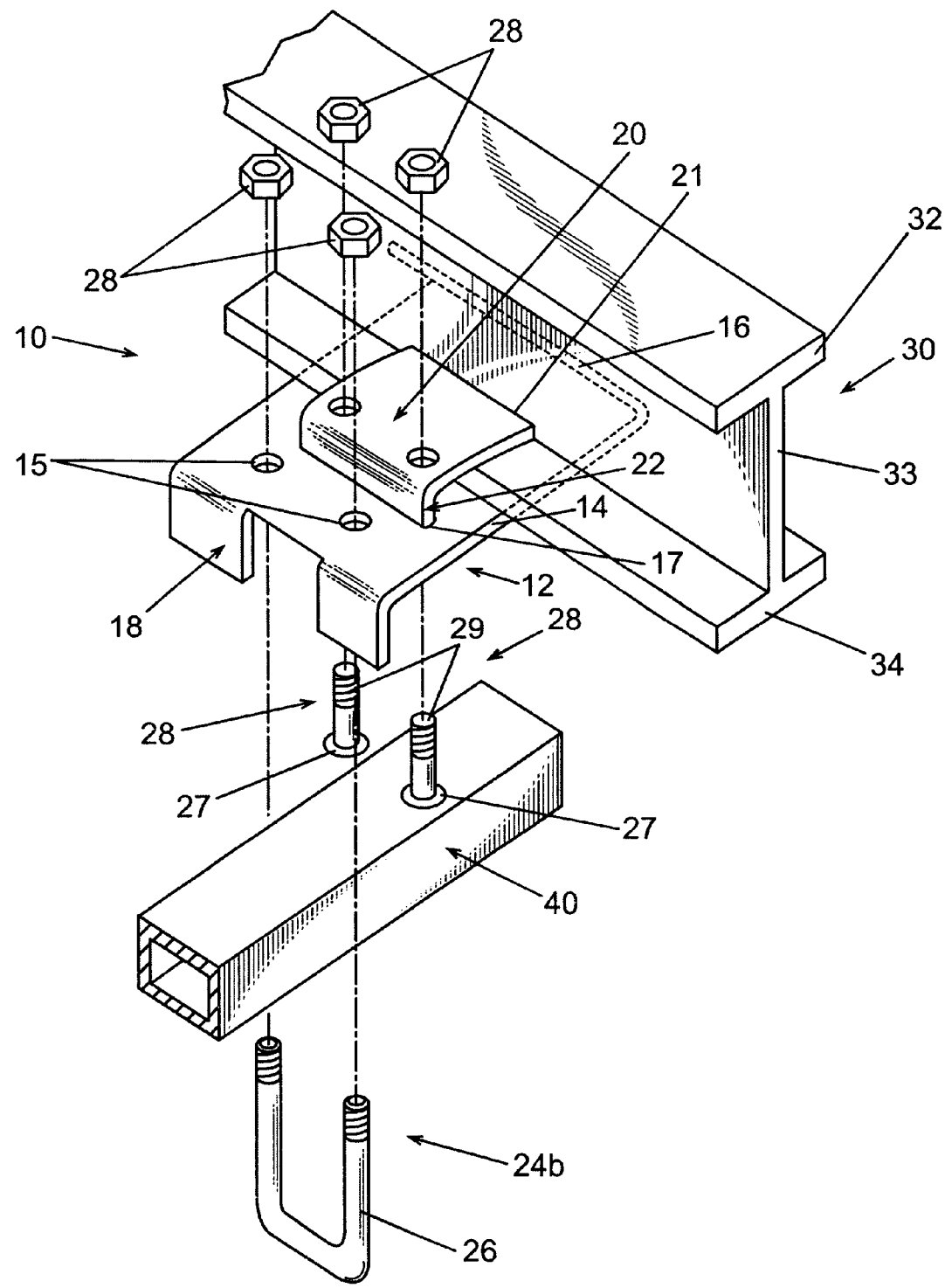
FIG. 2 is an exploded top perspective view of the connector assembly of FIG. 1.

Referring now in more detail to the drawings, in which like numerals indicate like parts throughout the several views, FIGS. 1 and 2 illustrate the left-hand portion of a preferred embodiment of an adjustable axle-frame connector 10. The adjustable axle-frame connector 10 includes an axle mounting plate 16, an axle hold down bracket 20, and a securing means 24a, in the instant case comprising a U-bolt 26 and threaded fasteners 28. Although not required for all embodiments of the adjustable axle-frame connector 10, a secondary securing means 24b is shown in the embodiment depicted in FIGS. 1 and 2. Also depicted are a frame 30 and a torsion axle 40. The axle mounting plate 12 comprises a substantially planar mid portion 14 between the holding flange 16 and positioning tabs 18. The substantially planar mid portion 14 includes a number of apertures 15 formed therein through which the securing means 24a, 24b pass. As well, the substantially planar mid portion 14 includes a mounting slot for engaging the axle hold down bracket 20. The axle hold down bracket 20 includes a proximal end 21, a locator flange 22, and a middle portion 23. As well, the middle portion 23 includes apertures 15 through which the securing means 24a pass. In the preferred embodiment shown in FIGS. 1 and 2, note that not only is the axle hold down bracket 20 substantially L-shaped, but the middle portion 23 also forms an arched body portion 25. Preferably, the axle hold down bracket 20 is constructed from spring steel.

Figure 3:
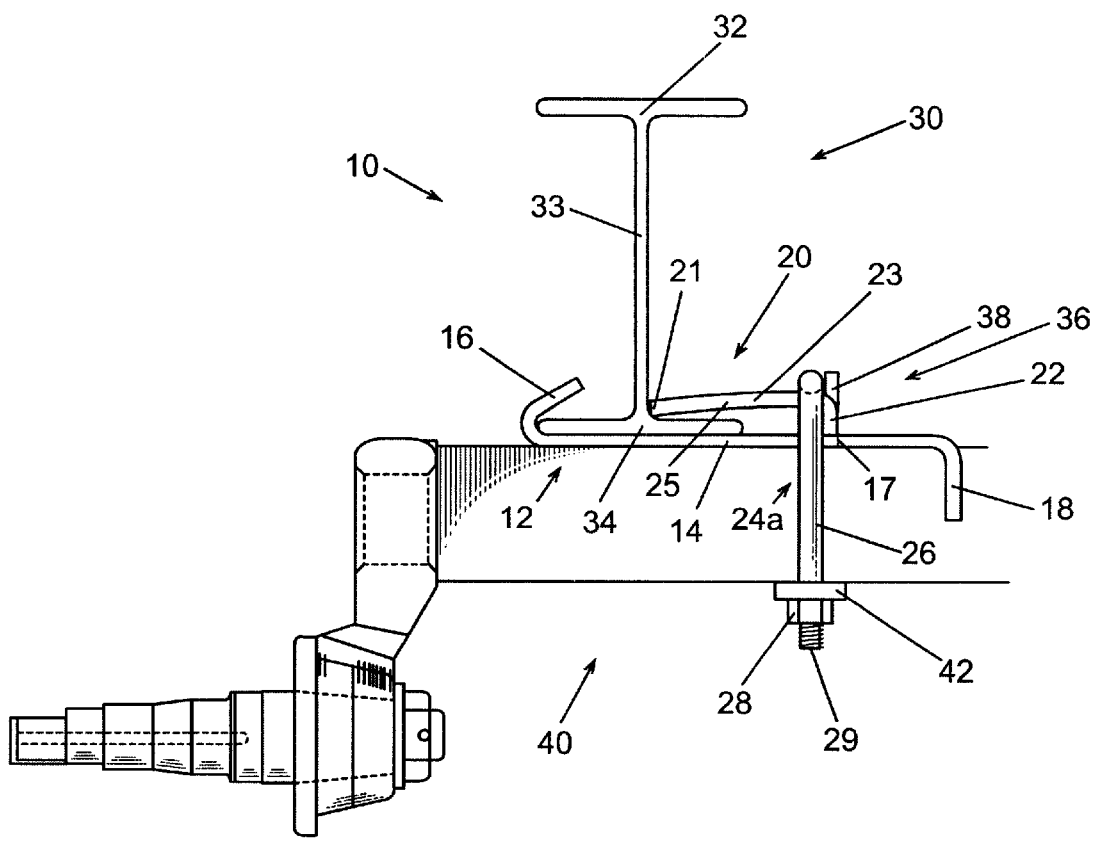
FIG. 3 is a back view of a left side connector assembly of an embodiment of the present invention, including portions of both a frame and an axle.
Figure 4:
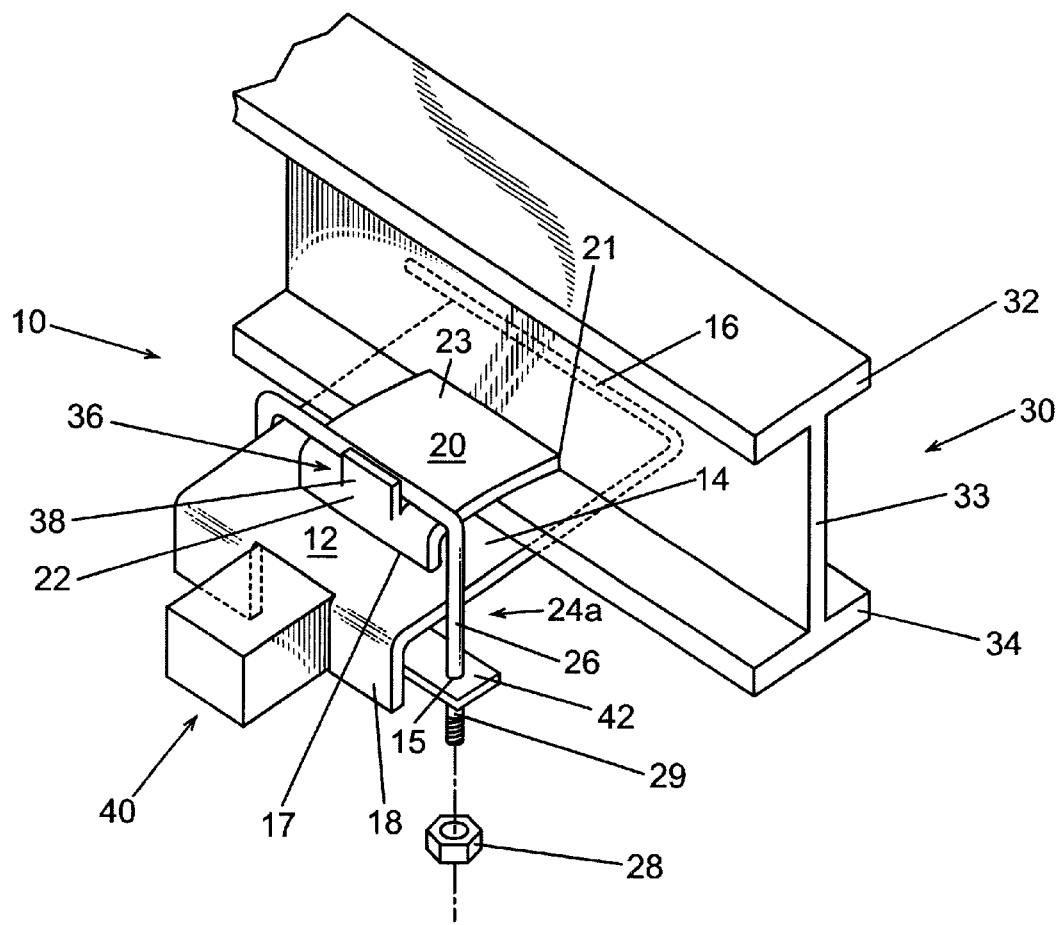
FIG. 4 is an exploded top perspective view of the connector assembly of FIG. 3.

Note that while the preferred embodiment depicted in FIGS. 1 and 2 includes two securing means 24a, 24b, and four apertures 15 in the axle mounting plate 12, only one securing means 24a is required and other embodiments do not require any apertures 15 in the axle mounting plate 12 (FIGS. 3 and 4). Similarly, also note that apertures 15 in the axle hold down bracket 20 are not required in all embodiments (FIGS. 3 and 4).

As previously noted, vehicle frames, like trailers, are quite often I-beams. In the preferred embodiments shown, the frame 30 is an I-beam comprising an upper flange 32 and a lower flange 34 connected by a vertical web 33. It is also common to have an axle 40 with a box-shaped cross section (FIGS. 2 and 4).

Operation

One embodiment of the adjustable axle-frame connector 10 of the present invention shown in FIG. 1 includes an axle mounting plate 12, an axle hold down bracket 20, and securing means 24a, and may be used to temporarily-secure an axle 40 to a frame 30. The operation of the adjustable axle-frame connector 10 will now be described.

First, the holding flange 16 of the axle mounting plate 12 is placed over a potion of the lower flange 34 of the frame 30 such that the substantially planar mid portion 14 of the axle mounting plate 12 abuts the lower flange 34. Please note, that although as shown in FIGS. 1 and 2, the outside edge of the lower flange 34 is engaged by the holding flange 16, one could just as easily engage the inner edge of the lower flange 34. As shown in FIG. 1, the axle 40 is then positioned such that the axle mounting plate 12 is "sandwiched" between the frame 30 and the axle 40. To ensure proper alignment and prevent possible slippage of the axle 40 relative to the frame 30, the positioning tabs 18 of the axle mounting plate 12 are positioned such that they straddle the axle 40, one being in front of and one behind the axle 40. Next, the locator flange 22 of the axle hold down bracket 20 is placed in the mounting slot 17 of the axle mounting plate 12 and the proximal end 21 is placed such that it abuts the frame 30 where the web 33 is connected to the lower flange 34. Note that when the axle mounting plate 12 and the axle hold down bracket 20 are in this position, the apertures 15 in the axle mounting plate 12, disposed between the mounting slot 17 and the inner edge of the lower flange 34, are substantially aligned with the apertures 15 in the axle hold down bracket 20. In this configuration, the threaded ends 29 of the securing means 24a pass through both sets of apertures 15.

Note that in the embodiment of FIG. 1, only the U-bolt 26 passing under the axle 40 and through the apertures 15 in both the axle mounting plate 12 and the axle hold down bracket 20 is required to secure the axle to the frame 30. As the threaded ends 29 of the U-bolt 26 are engaged with threaded fasteners 28, the axle hold down bracket 20 is urged toward the axle mounting plate 12 and the axle 40 is held in abutment with the substantially planar mid portion 14 of the axle mounting plate 12. Because the proximal end 21 securely abuts the web of the frame 30, as the arched body portion 25 is urged toward the axle mounting plate 12, the locator flange 22 is urged along the longitudinal axis of the axle 40. In turn, because the locator flange 22 is securely positioned in the mounting slot 17, the axle mounting plate 12 is also urged along the longitudinal axis of the axle 40, thereby ensuring the holding flange 16 is secured against the outer edge of the lower flange 34. As well, the lower flange 34 of the frame 30 is held securely, or "pinched," between the proximal end 21 of the axle hold down bracket 20 and the axle mounting plate 12.

As described above, the use of securing means 24a is all that is needed to secure each end of the axle 40 to the frame 30. However, it is possible to use a secondary securing means 24b to further secure the axle 40 to the axle mounting plate 12. As shown in FIGS. 1 and 2, a second set of apertures 15 are formed in the axle mounting plate 12 between the mounting slot 17 and the positioning tabs 18. The threaded ends 29 of the secondary securing means 24b, in the instant case a second U-bolt 26, are inserted into the apertures 15 such that the axle 40 is cradled by the U-bolt 26. The threaded ends 29 are then engaged by threaded fasteners 28, thereby securing the axle 40 and the axle mounting plate 12 together.

Note that when secondary securing means 24b is used as shown in FIGS. 1 and 2, it is not necessary to have the securing means 24a cradle the axle 40 in order to secure the axle 40 to the frame 30. As shown in FIG. 2, a U-bolt 26 is used as the secondary securing means 24b to secure the axle 40 to the axle mounting plate 12. This permits the use of, two separate threaded fasteners 28 to secure the axle mounting plate 12 and axle hold down bracket 20 to the frame 30, which in turn secures the axle 40 to the frame 30. As shown, the separate threaded fasteners 28 have threaded ends 29 and head portions 27 sized and configured such that the head portion 27 will not pass through the apertures 15 in either the axle mounting plate 12 or the axle hold down bracket 20.

Yet another of the many possible embodiments is shown in FIGS. 3 and 4. Rather than utilizing apertures 15 to ensure proper alignment of the axle mounting plate 12 and axle hold down bracket 20 as the securing means 24a are installed, a positioning means 36 is utilized. As shown, the positioning means 36 comprises a tab 38 formed form the material of the middle portion 23 of the axle hold down bracket 20. Numerous other embodiments of positioning means 36 exist, for example, a groove or notch formed in the axle hold down bracket 20 and configured to prevent slippage of the securing means 24a. However, the tab 38 has been shown due to relative ease of manufacture. Note as well, as there are no apertures 15 present in either the axle mounting plate 12 or the axle hold down bracket 20, a plate means 42 with apertures 15 formed therein have been provided. This permits the axle hold down bracket 20, axle mounting plate 12 and axle 40 to be secured to the frame 30 by using a U-bolt 26. As shown, the U-bolt 26 is installed with the threaded ends 28 extending downwardly through the apertures 15 in the plate means 42. However, the axle 40 can also be secured to the frame 30 by positioning the plate means 42 in abutment with the positioning means 36, and passing the threaded ends 29 of the U-bolt 26 upwardly through the aperture 15 in the plate means 42 and engaging those ends with threaded fasteners 28.

Figure 5:
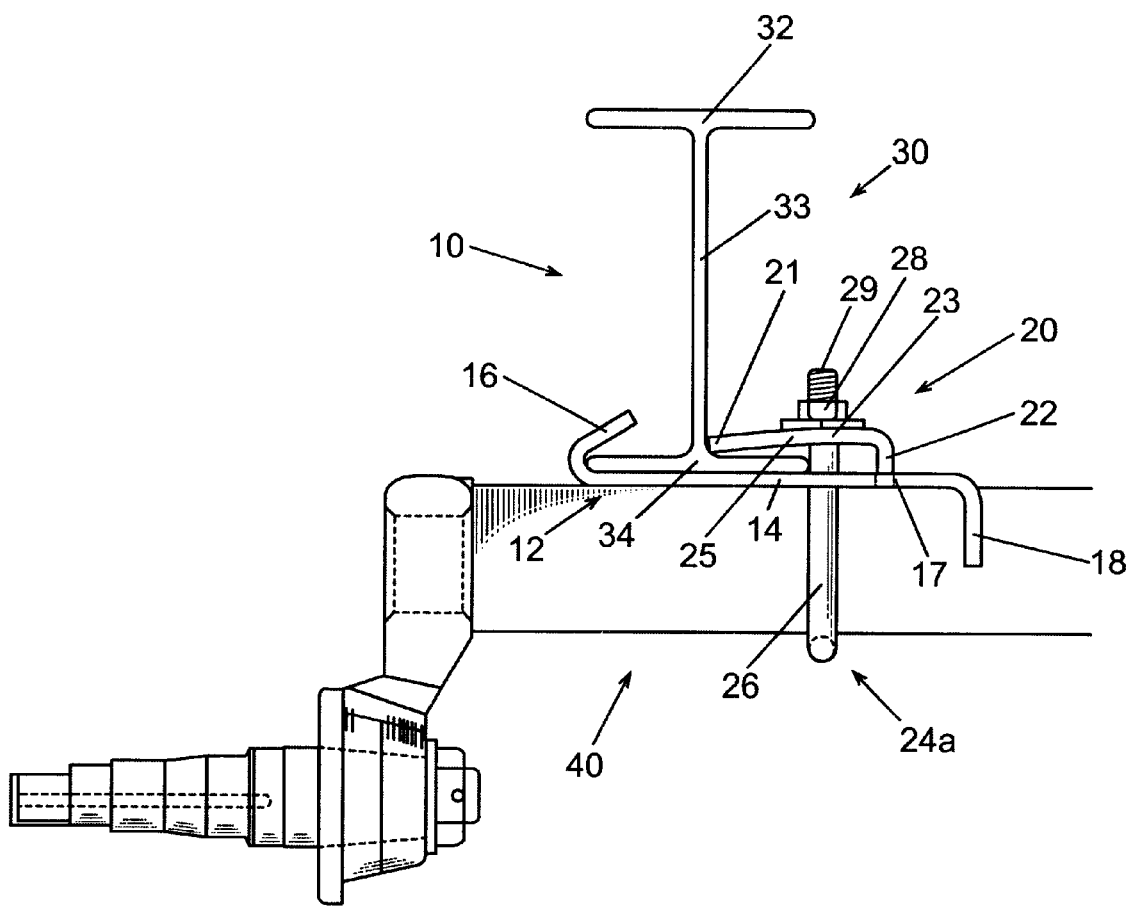
FIG. 5 is a back view of a left side connector assembly of yet another embodiment of the present invention, including portions of both a frame and an axle.
Figure 6A:
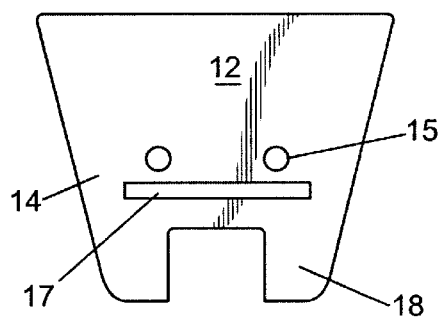
FIGS. 6A, 6B, 6C, and 6D are top (prior to final fabrication step), top, rear, and side views as would be viewed relative to a vehicle frame, respectively, of the axle mounting plate shown in FIG. 5.
Figure 6B:
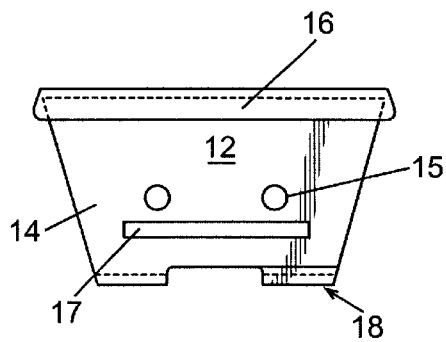
Figure 6C:
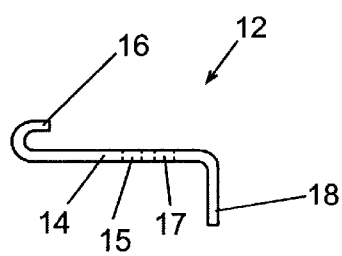
Figure 6D:
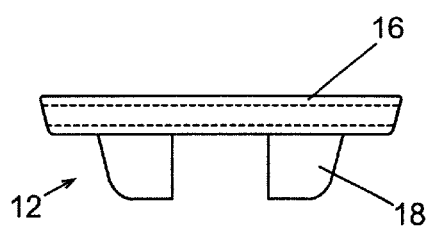
Figure 7A:
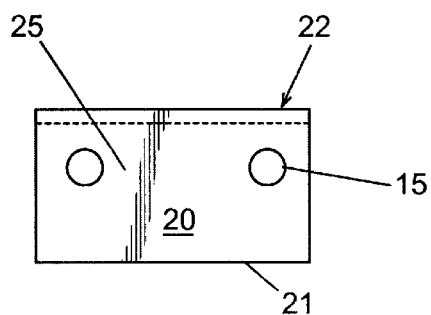
FIGS. 7A and 7B are top and rear views as would be viewed relative to a vehicle frame, respectively, of the axle hold down bracket shown in FIG. 5.
Figure 7B:
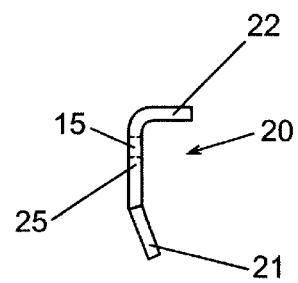

Similar to the embodiment shown in FIGS. 3 and 4, the embodiment revealed in FIG. 5 permits an axle 40 to be secured to a frame 30 by using only securing means 24a. Installation of the embodiment shown is substantially the same as that of the embodiment shown in FIG. 1, however, no secondary securing means 24b is used. This means that only those apertures 15 in the axle mounting plate 12 are required that are substantially aligned with the apertures 15 in the axle hold down bracket 20. In this configuration, the threaded ends 29 of the securing means 24a pass through both sets of apertures 15. As the threaded ends 29 of the U-bolt 26 are engaged with threaded fasteners 28, the axle hold down bracket 20 is urged toward the axle mounting plate 12 and the axle 40 is held in abutment with the substantially planar mid portion 14 of the axle mounting plate 12. Because the proximal end 21 securely abuts the web of the frame 30, as the arched body portion 25 is urged toward the axle mounting plate 12, the locator flange 22 is urged along the longitudinal axis of the axle 40. In turn, because the locator flange 22 is securely positioned in the mounting slot 17, the axle mounting plate 12 is also urged along the longitudinal axis of the axle 40, thereby ensuring the holding flange 16 is secured against the outer edge of the lower flange 34. As well, the lower flange 34 of the frame 30 is held securely, or "pinched," between the proximal end 21 of the axle hold down bracket 20 and the axle mounting plate 12.

FIGS. 6A–6D and FIGS. 7A–7B show the embodiments of the axle mounting plate 12 and axle hold down bracket 20, respectively, of the embodiment of the present invention shown in FIG. 5. These figures are intended to show some of the major advantages of the present invention, for example, relatively simple construction and the ease with which these components can be manufactured.

It should be emphasized that the above-described embodiments of the present invention, particularly, any preferred embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. An adjustable connector for mounting an axle to a frame of a vehicle, the vehicle frame having an I-beam parallel to a longitudinal axis of the vehicle, the I-beam having an upper flange and a lower flange connected by a vertical web, each of the flanges having an inner edge and an outer edge relative to the longitudinal axis of the vehicle, comprising;

an axle mounting plate having a first end, a second end, a first plurality of apertures and a mounting slot formed therein, said first end having a holding flange configured to engage the outer edge of the lower flange of the vehicle frame when said axle mounting plate is positioned between the lower flange of the vehicle frame and the axle running transverse to the longitudinal axis of the vehicle, said second end having positioning tabs extending downwardly and configured to straddle the axle when said axle mounting plate is positioned between the lower flange of the vehicle frame and the axle;

an axle hold down bracket having a proximal end, a distal end, an arched body portion there between and a first plurality of apertures formed in said arched body portion, said distal end having a locator flange, said locator flange configured to engage said mounting slot formed in said axle mounting plate, said proximal end adapted to abut the web of the vehicle frame;

a U-bolt having two substantially parallel legs and a base leg extending therebetween, each of said substantially parallel legs having an end configured to receive a threaded fastener, said U-bolt being sized and shaped for straddling the axle with its legs extending upwardly through said first plurality of apertures formed in said axle mounting plate and through said first plurality of apertures formed in said axle hold down bracket, said first plurality of apertures formed in said axle hold down bracket configured to be in substantial alignment with said first plurality of apertures formed in said axle mounting plate when said locator flange engages said mounting slot and said proximal end is in abutment with the web portion of the vehicle frame;

whereby, as said ends of said U-bolt are engaged by said threaded fasteners, said arched body portion of said axle hold down bracket is urged toward said axle mounting plate and the axle, thereby urging said distal end of said axle hold down bracket along the longitudinal axis of the axle and said proximal end of said axle hold down bracket is held in abutment with the web of the vehicle frame, such that said axle mounting plate is similarly urged along the longitudinal axis of the axle, thereby causing said holding flange to securely engage the vehicle frame.

2. The adjustable connector of claim 1, further comprising;

a second plurality of apertures formed in said axle mounting plate, wherein said second plurality of apertures is disposed intermediate said mounting slot and said second end;

a second U-bolt, said second U-bolt having two substantially parallel legs and a base leg extending therebetween, each of said substantially parallel legs having an end configured to receive a threaded fastener, said second U-bolt being sized and shaped for straddling the axle with said parallel legs extending upwardly through said second plurality of apertures formed in said axle mounting plate;

whereby, as said ends of said second U-bolt are engaged by said threaded fasteners, the axle is secured to said axle mounting plate.

3. An adjustable connector for mounting an axle to a frame of a vehicle, comprising;
   an axle mounting plate having a first end for positioning on a first side of the frame of the vehicle, a second end, a mounting slot formed therein for positioning on the second side of the frame, said first end configured to engage the frame when said axle mounting plate is positioned between the frame and the axle, the axle extending transversely to the longitudinal axis of the frame, said second end having positioning tabs configured to straddle the axle when said axle mounting plate is positioned between the frame and the axle;
   an axle hold down bracket having a proximal end and a distal end, said distal end having a locator flange, said locator flange configured to engage said mounting slot of said axle mounting plate, said proximal end adapted to abut the frame of the vehicle; and
   a securing means for urging said axle hold down bracket against the frame of the vehicle.

4. The adjustable connector of claim 3, wherein said securing means further secures the axle to the frame.

5. The adjustable connector of claim 3, said axle hold down bracket further comprising a positioning means disposed on said distal end and configured to engage a portion of said securing means such that said securing means remains in a position relative to the frame as said axle hold down bracket is urged against the frame of the vehicle.

6. The adjustable connector of claim 5, wherein said securing means simultaneously urges said axle hold down bracket against the frame and secures the axle to the frame.

7. The adjustable connector of claim 6, said securing means further comprising a U-bolt and a plate means, said plate means having apertures formed therein, said U-bolt having two substantially parallel legs and a base leg extending therebetween, each of said substantially parallel legs having an end configured to receive a threaded fastener, said U-bolt being sized and shaped for straddling the axle with said parallel legs extending downwardly such that said base leg engages said positioning means and said ends of said legs pass through said apertures formed in said plate means, said plate means being positioned under the axle such that as said ends of said U-bolt are engaged by said threaded fasteners, the axle is secured to the frame.

8. An adjustable connector for mounting an axle to a frame of a vehicle, such that the axle is perpendicular to the longitudinal axis of the frame, comprising;
   an axle mounting plate having a first end, a second end, a first plurality of apertures and a mounting slot formed therein, said first end configured to engage the frame when said axle mounting plate is positioned between the frame and the axle, said second end having positioning tabs extending downwardly and configured to straddle the axle when said axle mounting plate is positioned between the frame and the axle;
   an axle hold down bracket having a proximal end, a distal end, and a first plurality of apertures formed therein, said distal end having a locator flange, said locator flange configured to engage said mounting slot formed in said axle mounting plate, said proximal end adapted to abut the frame; and
   a securing means for holding said axle mounting plate and said axle hold down bracket in position relative to each other.

9. The adjustable connector of claim 8, wherein said first end of said axle mounting plate is substantially hook shaped.

10. The adjustable connector of claim 9, said positioning tabs being substantially perpendicular to said axle mounting plate and spaced such that said positioning tabs are in close proximity to opposing sides of the axle when said axle mounting plate is positioned between the frame and the axle.

11. The adjustable connector of claim 8, said axle hold down bracket further comprising an arched body portion intermediate said proximal end and said distal end, said arched body portion configured to resist motion toward said axle mounting plate.

12. The adjustable connector of claim 8, said mounting slot formed in said axle mounting plate being substantially rectangular shaped.

13. The adjustable connector of claim 8, said securing means comprising a U-bolt, said U-bolt having two substantially parallel legs and a base leg extending therebetween, each of said substantially parallel legs having an end configured to receive a threaded fastener.

14. The adjustable connector of claim 13, said U-bolt being sized and shaped for straddling the axle with said parallel legs extending upwardly through said first plurality of apertures formed in said axle mounting plate and through said first plurality of apertures formed in said axle hold down bracket, such that as said threaded ends of said elongated members are engaged by fasteners, the axle is firmly secured to the frame.

15. The adjustable connector of claim 13, further comprising;
   a second plurality of apertures formed in said axle mounting plate intermediate said mounting slot and said second end;
   a second u-bolt having two substantially parallel legs and a base leg extending therebetween, each of said substantially parallel legs having an end configured to receive a threaded fastener; and
   wherein said second U-bolt being sized and shaped for straddling the axle with said parallel legs extending upwardly through said second plurality of apertures formed in said axle mounting plate, such that as said threaded ends of said elongated legs are engaged by said threaded fasteners, the axle is firmly secured to the axle mounting plate.

16. The adjustable connector of claim 8, further comprising;
   a second plurality of apertures formed in said axle mounting plate intermediate said mounting slot and said second end;
   a U-bolt having two substantially parallel legs and a base leg extending therebetween, each of said substantially parallel legs having an end configured to receive a threaded fastener;
   said securing means comprising a first and second bolt, said first and second bolts having a first and a second end, said first end configured to receive a threaded fastener, and said second end having a head configured such that said head will not pass through an aperture of said first plurality of apertures; and
   wherein said U-bolt is sized and shaped for straddling the axle with its legs extending upwardly through said second plurality of apertures formed in said axle mounting plate, such that as said threaded ends of said elongated legs are engaged by said threaded fasteners, the axle is firmly secured to the axle mounting plate, and said first ends of said first and second bolts extend upwardly through different of said first plurality of apertures formed in said axle mounting plate and through said first plurality of apertures formed in said axle hold down bracket, such that as said threaded ends of said first and second bolts are engaged by said threaded fasteners, the axle mounting plate is firmly secured to the frame.

17. The adjustable connector of claim 8, wherein said axle hold down bracket further comprises spring steel.

18. The adjustable connector of claim 8, wherein the frame is an I-beam.

19. The adjustable connector of claim 8, wherein the axle is a torsion axle.

20. An adjustable connector for mounting an axle to a frame of a vehicle, such that the axle is perpendicular to the longitudinal axis of the frame, comprising:

an axle mounting plate having a first end, a second end, and an intermediate body portion between said first and second ends, said first end configured to connect to a frame of a vehicle when said axle mounting plate is positioned between the frame and the axle with said intermediate body portion extending between the frame and the axle and the second end extending beyond the frame and defining a mounting slot;

an axle hold down bracket having a proximal end, a distal end, said distal end having a locator flange configured to engage said mounting slot formed in said second end of said axle mounting plate, said proximal end adapted to abut the frame of the vehicle; and a securing means for extending about the axle of the vehicle and engaging said hold down bracket and holding said axle mounting plate and said axle hold down bracket in position relative to each other.

21. A method for securing an axle to a frame, comprising the steps of:

providing an axle mounting plate having a first end, a second end, and a first plurality of apertures and a mounting slot formed therein, said first end configured to engage a frame, said second end having positioning tabs configured to lie on opposing sides of the axle when said axle mounting plate is positioned between the frame and the axle;

providing an axle hold down bracket having a proximal end, a distal end, and a first plurality of apertures formed therein, said distal end having a locator flange, said locator flange configured to engage said mounting slot disposed in said axle mounting plate, said proximal end adapted to abut a portion of the frame;

providing a securing means for maintaining the axle, said axle mounting plate, and said axle hold down bracket in position relative to the frame;

engaging the frame with said first end of said axle hold down plate;

positioning the axle between said positioning tabs such that said axle mounting plate abuts both the frame and the axle;

inserting said distal end of said axle hold down bracket in said mounting slot;

placing said proximal end of said axle hold down bracket in abutment with the frame such that a portion of the frame is located between said first end of said axle mounting plate and said proximal end of said axle hold down bracket;

inserting said securing means through said first pluralities of apertures in said axle mounting plate and said axle hold down bracket; and engaging said securing means such that the axle, said axle mounting plate, and said axle hold down bracket are secured to the frame.

\* \* \* \* \*